United States Patent [19]
Luvison et al.

[11] 3,984,789
[45] Oct. 5, 1976

[54] DIGITAL EQUALIZER FOR DATA-TRANSMISSION SYSTEM

[75] Inventors: Angelo Luvison, Turin; Giancarlo Pirani, Genoa, both of Italy

[73] Assignee: CSELT - Centro Studi e Laboratori Telecomunicazioni, Turin, Italy

[22] Filed: Nov. 17, 1975

[21] Appl. No.: 632,588

[30] Foreign Application Priority Data
Nov. 15, 1974 Italy.................................. 70343/74

[52] U.S. Cl.................................. 333/18; 325/42; 325/323
[51] Int. Cl.².......................................... H04B 3/04
[58] Field of Search ............... 333/18; 325/42, 323, 325/162; 179/15 AE

[56] References Cited
UNITED STATES PATENTS

| | | | |
|---|---|---|---|
| 3,792,356 | 2/1974 | Kobayashi et al. | 325/42 |
| 3,875,515 | 4/1975 | Stuart et al. | 325/323 |

*Primary Examiner*—Paul L. Gensler
*Attorney, Agent, or Firm*—Karl F. Ross; Herbert Dubno

[57] ABSTRACT

Incoming data pulses from a transmission channel are differentially combined with feedback pulses from the downstream end of a cascade of (N−1) delay networks to form an updating signal fed in parallel to a first set of multipliers for weighting with respective coefficients $b_1 - b_{N-1}$. These multipliers deliver optimized signal components to the inputs of respective delay networks of the cascade, through the intermediary of adders in each instance except for the first delay network at the upstream end; a further adder downstream of the last delay network may superimpose the updating signal, weighted with a coefficient $b_N$ by an $N^{th}$ multiplier of the first set, upon the feedback pulse issuing from the last delay network to generate an additional signal component. At least the more significant signal components, from the inputs of the delay networks located further upstream in the cascade, are weighted in a second set of multipliers with respective coefficients $a_1$, $a_2$ etc. before being additively combined, in a summing circuit, into a composite output signal.

4 Claims, 3 Drawing Figures

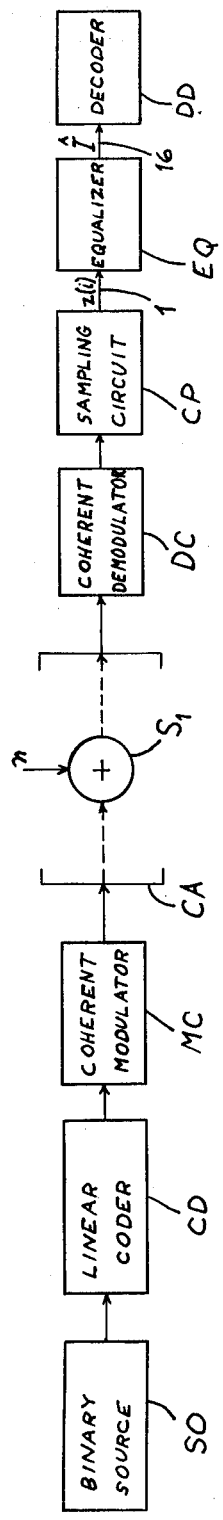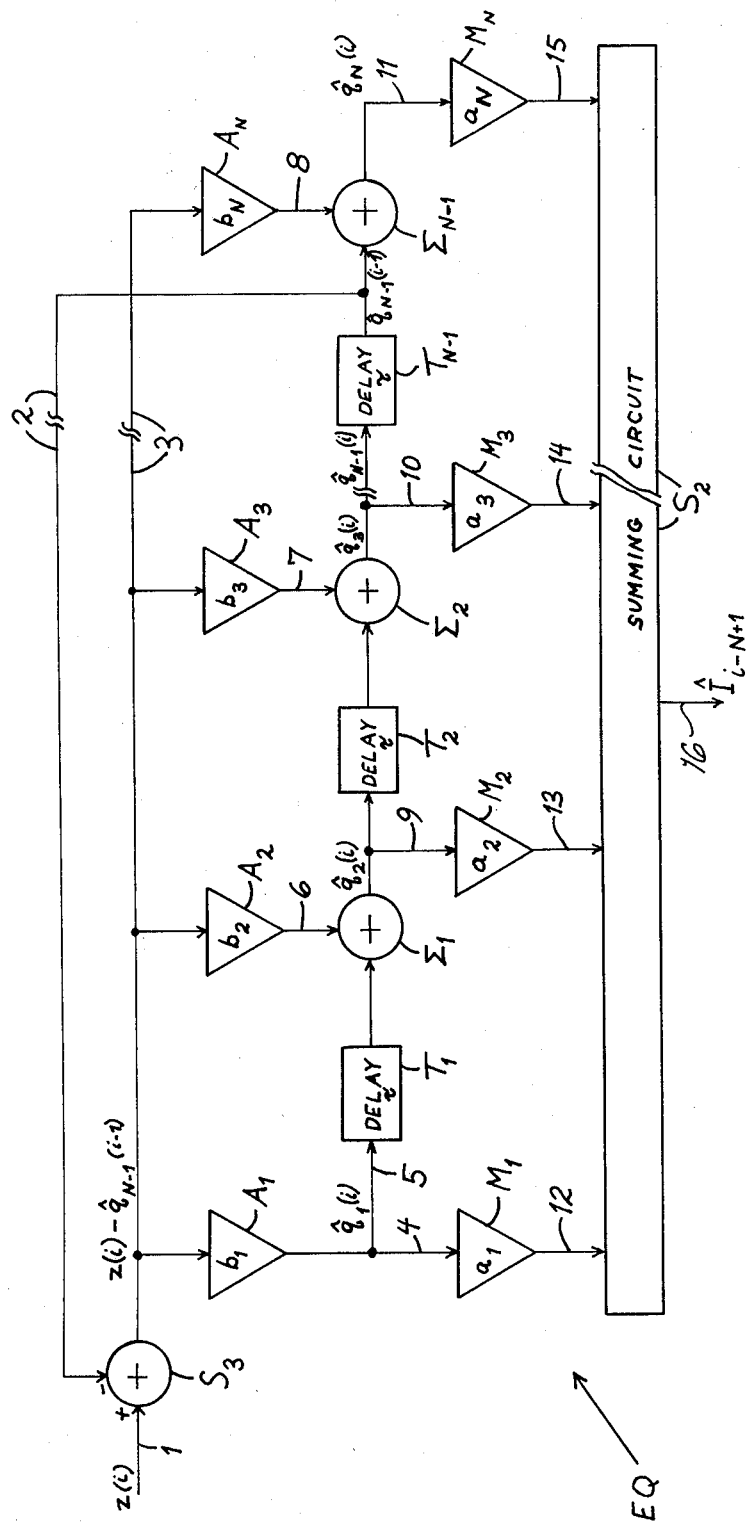
FIG. 1
FIG. 2

DIGITAL EQUALIZER FOR DATA-TRANSMISSION SYSTEM

CROSS-REFERENCE TO RELATED APPLICATION

This application contains subject matter disclosed in our copending application Ser. No. 572,335 filed April 28, 1975.

FIELD OF THE INVENTION

Our present invention relates to an equalizer for digital messages designed to be inserted between a channel for high-speed data transmission and a load receiving the transmitted data.

BACKGROUND OF THE INVENTION

In the transmission of digital data on a telephone channel, for example, signal degradation generally occurs on account of thermal noise and interference between adjoining data pulses which may partly overlap, especially if transmission speeds are high. To minimize such distortion, use is conventionally made of filtering networks known as equalizers which are designed to flatten the amplitude characteristic and to linearize the phase characteristic of the transmission channel. Such conventional equalizers, consisting of cascaded passive phase shifters, are based upon the structural characteristics of the signal path and cannot take into account certain factors arising only in operation.

More recent developments, therefore, include the design of adjustable equalizers of the so-called "transverse-filter" type with a response characteristic adaptable to existing operating conditions. These equalizers are put through two successive phases, i.e. a preliminary or acquisition phase and a subsequent operational or working phase. In the acquisition phase the equalizer rapidly adjusts itself, on the basis of a series of predetermined test codes transmitted over the channel and identical reference codes generated locally at the receiving end, while during the working phase it follows the gradual changes in transmission characteristics in response to an error signal fed back from a signal-regenerating unit in its output. Such a signal regenerator, which may be referred to as a decision network, quantizes the data pulses issuing from the equalizer according to predetermined levels of pulse magnitude; the detected differences between the quantized levels and the actual output signal serve for the automatic adjustment of the parameters of the equalizer in a sense tending to reduce the error signal to zero.

In the system described and claimed in our above-identified copending application, the equalizer has a data lead for incoming pulses as well as several branch leads each provided with adjustable digital multipliers acting as weighting means. The data lead and the branch leads are connected to a summing circuit which algebraically combines an incoming data pulse with weighted pulses from the several branch leads to form an updating signal fed in parallel to all these leads. The branch leads are further connected to a synthesizing circuit which additively combines their weighted pulses, derived from the updating signal, into a composite signal. Another summer, acting as a comparison circuit, is connected to the synthesizing circuit and to a source of reference signals, specifically to a local code generator during the acquisition phase and to a quantizing decoder during the working phase, for deriving an error signal from the aforementioned reference and composite signals; with the aid of arithmetic means connected to the comparison circuit, this error signal is translated into a control signal fed to the weighting means for adjusting same as to vary the magnitude of the weighted pulses in a sense tending to reduce the error signal. The synthesizing circuit comprises a multiplicity of cascaded delay networks respectively inserted in the several branch leads downstream of their weighting means, each branch lead other than the first one containing an adder at a junction between its multiplier and its delay network connected to the output of the immediately preceding (upstream) delay network.

OBJECT OF THE INVENTION

The object of our present invention is to provide an improved equalizer, of the general character disclosed in our copending application above referred to, which is of simpler construction, less expensive, and more reliable in its operation.

SUMMARY OF THE INVENTION

We have found, on the basis of an algorithm to be explained below, that the foregoing object is satisfied by an equalizer in which the updating signal is derived from the downstream end of a cascade of delay networks, similar to the synthesizing circuit of our copending application, delivering a feedback signal to a first arithmetic means which differentially combines it with an incoming pulse during each pulse cycle, the duration of a pulse cycle corresponding — as in our prior system — to the delay time of each of these networks. This updating system, fed to each delay network, is individually weighted with a predetermined first coefficient in the first arithmetic means which may comprise a first set of multipliers supplied in parallel from a first summing circuit receiving the incoming pulse as well as the feedback signal. A second arithmetic means, which may comprise a second set of multipliers working into a second summing circuit, has input connections to the inputs of at least two of the delay networks proximal to the upstream end of the cascade for combining their signal components, after individually weighting them with predetermined second coefficients, into a composite output signal.

The multipliers of the first set, except the one feeding the first (upstream) delay network, deliver their weighted updating signals to respective adders inserted between adjoining networks of the cascade. The number of multipliers in this first set may be greater than or equal to that of the multipliers of the second set. For maximum fidelity, a further adder may have an input connected to the downstream end of the cascade and another input connected to the output of the first summing circuit through a further multiplier of the first set (referred to hereinafter the $N^{th}$ multiplier) while having its output connected to the second summing circuit through a further ($N^{th}$) multiplier of the second set.

BRIEF DESCRIPTION OF THE DRAWING

Our invention will now be described in greater detail with reference to the accompanying drawing in which:

FIG. 1 is an overall view of a communication system including an equalizer according to our invention;

FIG. 2 is a circuit diagram of the qualizer of FIG. 1; and

SPECIFIC DESCRIPTION

Figure 3:
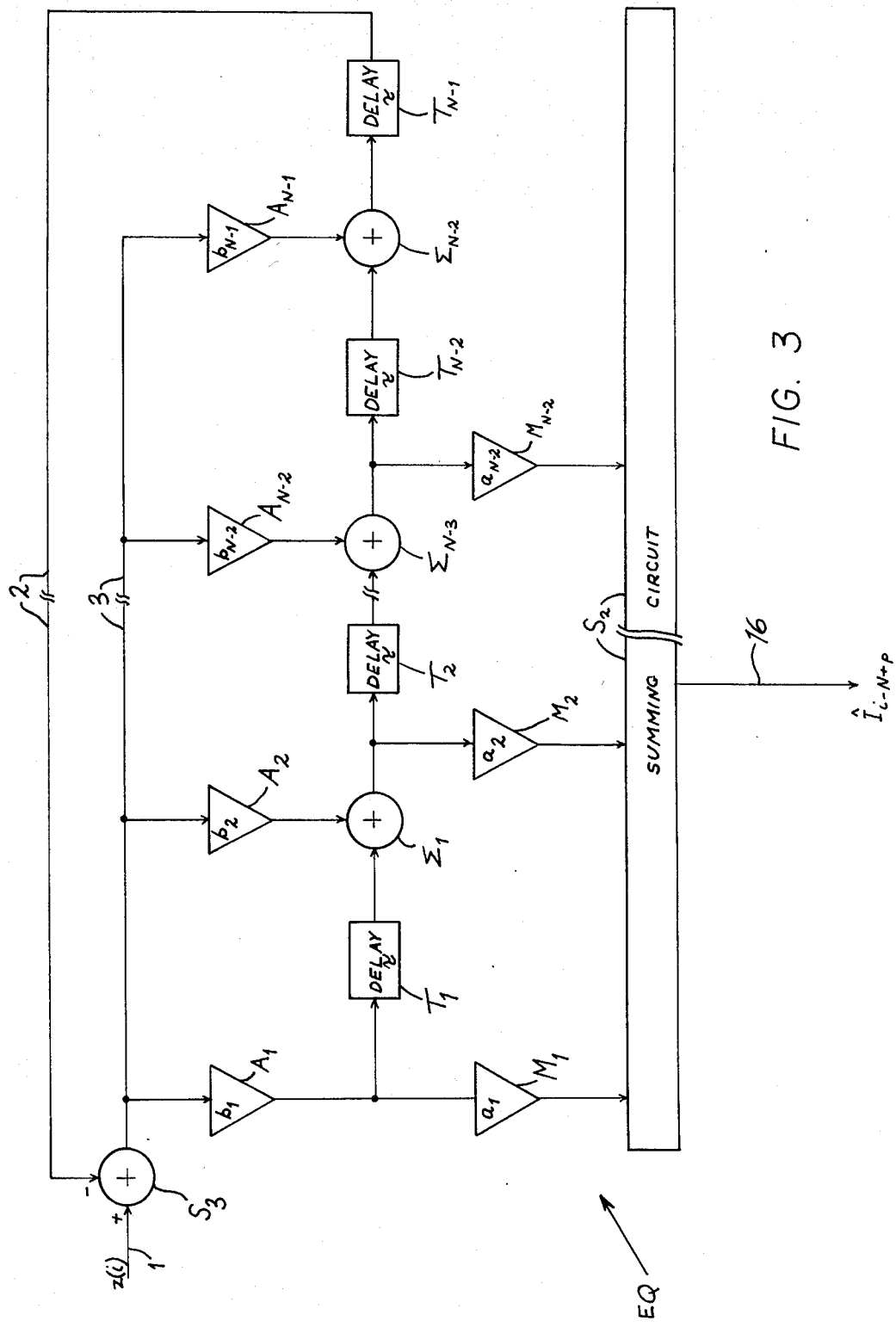
FIG. 3 is a similar circuit diagram illustrating a simplified embodiment.

In FIG. 1 we have shown a communication system for the transmission of binary messages originating at a source SO which works into a linear coder CD of conventional type. A coherent modulator MC, receiving a carrier wave from a nonillustrated oscillator, modulates that carrier with the output of coder CD. The resulting signals are fed to a transmission channel CA symbolically represented as including a summing circuit $S_1$ in which random noise $\eta$ is superimposed upon these signals. At the receiving end, the signals are detected in a coherent demodulator DC which is periodically sampled in a circuit CP at a bit rate $1/\tau$. The series of bits are supplied on a line 1 to an equalizer EQ according to our invention, of the recursive-filter type more fully described hereinafter, whose output lead 16 supplies pulses $\hat{I}$ to a decision circuit or quantizing decoder DD designed to reconstitute the message signals from source SO as is well known per se.

The construction of the qualizer EQ has been illustrated in FIG. 2 and is based upon our analysis of an algorithm of recursive filtration described by R. E. Kalman in an article entitled "A New Approach to Linear Filtering and Prediction Problems", Journal of Basic Engineering/Transactions of the ASME, March 1960. The article deals with the regeneration of signals of predetermined and time-invariant characteristics subject to noise and distortion in a dynamic system. The application of this theory to communication systems is discussed by H. Kaufman and R. E. Lawrence in an article entitled "The Kalman Filter For the Equalization of a Digital Communication Channel", IEEE, Transactions on Communication Technology, Vol. COM-19, December 1971. According to the latter article, an output signal may be synthesized from staggered constituents derived from an incoming data pulse and from data pulses received in preceding cycles, these constituents being weighted by respective coefficients $K_1, K_2, \ldots K_N$ to satisfy certain equations defining the current state of the signal. These constant coefficients $K_1$ etc. are determined by the structural characteristics of the communication channel in question.

The equalizer EQ shown in FIG. 2 comprises two summing circuits $S_2$ and $S_3$ in its output and in its input, respectively. Summer $S_3$ receives over line 1 the incoming data pulses $z(i)$ from sampler CP and over another line 2 a series of feedback pulses also generated during a cycle $\tau$. These feedback pulses are differentially combined with the incoming pulses $z(i)$ to energize an output lead 3 of circuit $S_3$, the letter $i$ denoting a particular pulse cycle in an indefinite sequence of such cycles as established by a nonillustrated time base synchronized with the coder CD of FIG. 1.

Lead 3 carries an updating signal delivered in parallel to the inputs of N amplifiers $A_1 - A_N$ with gains $b_1 - b_N$, these gains representing weighting coefficients by which the signals on lead 3 are multiplied in each amplifier. The amplifiers $A_1 - A_N$ may thus be regarded as a first set of amplifiers working into a cascade of delay networks $T_1 - T_{N-1}$, successive delay networks being separated by adders $\Sigma_1, \Sigma_2$ etc. A further adder $\Sigma_{N-1}$ follows the last delay network $T_{N-1}$, all these networks having identical delay periods $\tau$.

An output lead 5 of amplifier $A_1$ feeds a weighted updating signal to the first (upstream) delay network $T_1$ and has a branch 4 extending to the input of another amplifier $M_1$ with gain $a_1$, the latter amplifier forming part of a second set of multipliers inserted between the cascade $T_1 - T_{N-1}$ and the summer $S_2$. Thus, another amplifier $M_2$ of this latter set, having a gain $a_2$, is tied by way of a lead 9 to the input of network $T_2$ and therefore to the output of adder $\Sigma_1$ which combines the output pulses of network $T_1$ with pulses appearing on an output lead 6 of amplifier $A_2$, these latter pulses representing the updating signal on lead 3 multiplied by the gain $b_2$ of amplifier $A_2$. In an analogous manner, an amplifier $M_3$ of gain $a_3$ has an input 10 connected to the junction of the next-following delay network (not shown) with adder $\Sigma_2$, the latter receiving the output of network $T_2$ as well as the pulses appearing on an output lead 7 of amplifier $A_3$, i.e. the updating signal weighted by the gain $b_3$ of that amplifier. The final amplifier $A_N$ of the first set of multipliers weights the updating signal on lead 3 with is own gain $b_N$ and feeds it to adder $\Sigma_{N-1}$ which also receives the output pulses of the last (downstream) delay network $T_{N-1}$ of the cascade, these output pulses being identical with the aforementioned feedback signal returned to summer $S_3$ via lead 2. Adder $\Sigma_{N-1}$ works into an input 11 of the last multiplier N of the second set having a gain $a_N$.

The output leads of multipliers $M_1, M_2, M_3$ and $M_N$ terminating at summer $S_2$ have been designated 12, 13, 14 and 15, respectively. Circuit $S_2$ has an output lead 16 carrying the outgoing signal $\hat{I}$ which, for reasons that will become apparent hereinafter, has been given the subscript $i-N+1$.

The components of output signal $\hat{I}$, prior to being weighted by multipliers $M_1 - M_N$, have been designated $\hat{q}_1(i), \hat{q}_2(i), \hat{q}_3(i) \ldots \hat{q}_{N-1}(i), \hat{q}_N(i)$. The feedback signal delivered by delay circuit $T_{N-1}$ to lead 2 has been labeled $\hat{q}_{N-1}(i-1)$ for reasons that will become clear hereinafter.

We shall now describe the algorithm which allows us to filter the incoming signal pulses $z(i)$ in a most effective manner with the aid of our improved equalizer as illustrated in FIG. 2 or in modified form in FIG. 3 described hereinafter.

Let us consider a sequence of N data pulses transmitted at the remote end (modulator MC in FIG. 1) to the channel CA from which the pulses $z(i)$ are obtained on line 1, these original pulses being designated $I_i, I_{i-1}, I_{i-2} \ldots I_{i-N+1}$. According to Kalman's theory, the original pulses $I_i - I_{i-N+1}$ are affected by respective channel coefficients $g(0), g(1) \ldots g(N-1)$. Thus, the pulse $z(i)$ can be expressed by $$z(i) = \sum_{j=0}^{N-1} g(j) I_{i-j} + \eta(i) = g(0)I_i + \sum_{j=1}^{N-1} g(j)I_{i-j} + \eta(i) \quad (1)$$

wherein the final term $\eta(i)$ constitutes the noise sample picked up by the virtual summing circuit $S_1$ in FIG. 1.

The second term $$\sum_{j=1}^{N-1} g(j)I_{i-j}$$

of equation (1) shows the degrading effect of interc-haracter interference upon the undegraded signal $g(0)I_i$.

Let us now consider a set of parameters $q_1(i), q_2(i) \ldots q_k(i) \ldots q_N(i)$ which may be termed signal-state variables and are defined by the following relationships:

$$\begin{cases} q_1(i) = g(N-1) I_i \\ q_2(i) = g(N-2) I_i + g(N-1)I_{i-1} \\ q_N(i) = \sum_{j=0}^{N-1} g(j)I_{i-j} \end{cases} \quad (2)$$

Equations (2) indicate that a parameter $q_{k+1}(i)$ can be derived from the immediately preceding term $q_k(i)$ by replacement of signals $I_i, I_{i-1}$ etc. with corresponding signals of next-lower rank, namely $I_{i-1}, I_{i-2}$ etc., and by the addition of a term $g(N-1-k)I_i$. The last parameter $q_N(i)$ of the set is identical with the signal $z(i)$ in FIG. 1, except for omission of the noise term $\eta(i)$.

From the foregoing analysis we can establish a new set of equations for the following pulse cycle $(i+1)$, namely $$\begin{cases} q_1(i+1) = q(N-1)I_{i-1} \\ q_2(i+1) = q_1(i)+g(N-2)I_{i-1} \\ \vdots \\ q_{N-1}(i+1) = q_{N-2}(i) + g(1)I_{i+1} \\ q_N(i+1) = q_{N-1}(i) + g(0)I_{i+1} \end{cases} \quad (3)$$

A comparison between equations (2) and (3) shows that any parameter $q_k(i+1)$ differs from a parameter $q_{k-1}(i)$ by the addition of a term $g(N-k)I_{i+1}$.

With the aid of Kalman's theory of recursive filtering, referred to above, we can now derive from equations (3) a new set of equations (4) for a series of optimized parameters $\hat{q}_1(i), \hat{q}_2(i), \ldots \hat{q}_N(i)$ which are the signal components appearing in the cascade of FIG. 2 and which can be defined as follows:

$$\begin{cases} \hat{q}_1(i) = b_1 [z(i) - \hat{q}_{N-1}(i-1)] \\ \hat{q}_k(i) = \hat{q}_{k-1}(i-1) + b_k [z(i) - \hat{q}_{N-1}(i-1)] \\ \hat{q}_N(i) = \hat{q}_{N-1}(i-1) + b_N [z(i) - \hat{q}_{N-1}(i-1)] \end{cases} \quad (4)$$

The term $[z(i)-\hat{q}_{N-1}(i-1)]$ in equations (4) represents the updating signal obtained on lead 3 in FIG. 2 by the subtraction of feedback signal $\hat{q}_{N-1}(i-1)$ from the incoming signal $z(i)$. This feedback signal is available, as will be apparent from the foregoing, at the output of delay network $T_{N-1}$.

The weighting coefficients $b_1, b_2 \ldots b_N$ are functions of the channel coefficients $g(0), g(1) \ldots g(N-1)$ and of statistical signal and noise conditions inherent in a given system. These coefficients can be precalculated in a manner described by us in an article entitled "Algorithmic and Computational Aspects in the Optimization of a Data Communication System", preprints of IFAC Schochastic Control Symposium, Budapest, Hungary, 25 – 27 September 1974, pp. 313 – 322. Such a precalculation eliminates the need for variable-gain amplifiers whose weighting coefficients $b_1 - b_N$ could be modified under the control of an error signal, as described in our above-identified copending application; in principle, however, such a self-adjusting system could also be used with our present invention.

The composite output signal $\hat{I}_{i-N+1}$ on lead 16 in FIG. 2 can now be defined by $$\hat{I}_{i-N+1} = \sum_{j=1}^{N} a_j \hat{q}_j(i) \quad (5)$$

where $a_j$ is a generalized term for the weighting coefficients introduced by multipliers $M_1 - M_N$. These weighting coefficients, in turn, are defined as follows:

$$\begin{cases} a_1 = -\frac{1}{g(N-1)} \sum_{i=1}^{N-1} g(i-1) a_{N-i+1} \\ a_2 = -\frac{1}{g(N-1)} \sum_{i=2}^{N-1} g(i-1) a_{N-i+2} \\ \vdots \\ a_N = -\frac{1}{g(N-1)} \end{cases} \quad (6)$$

Evidently, to calculate the values of coefficients $a_1 - a_N$ according to equations (6), it is necessary to start with the expression for $a_N$ and to work backwards to $a_1$.

The symbol $\hat{I}_{i-N+1}$ denotes that its constituents are derived from all the N original signals $I_i \ldots I_{i-N+1}$ referred to hereinabove. With lesser requirements of fidelity, however, one or more of the signals at the end of the series (farthest in time from the current signal $I_i$) may be omitted so that we may deal, instead, with a signal $$\hat{I}_{i-N+2} = \sum_{j=1}^{N-1} a_{j+1} \hat{q}_j(i) \quad (7)$$

or, more generally, $$\hat{I}_{i-N+p} = \sum_{j=1}^{N-p+1} a_{j+p-1} \hat{q}_j(i) \quad (8)$$

where $p$ may be any integer between 1 and N. Naturally, the filtering effect decreases as $p$ approaches N.

In FIG. 3 we have shown such a modified equalizer EQ' conforming to equation (8), with $p = 3$ and consequent omission of multiplier $M_N$ and the immediately preceding multiplier of that set which therefore consists of multipliers $M_1, M_2 \ldots M_{N-2}$. In this case, as well as in all other instances where $p > 1$, multiplier $A_N$ of the first set and the associated adder $\Sigma_{N-1}$ are functionless and are therefore also left out. This entails a substantial simplification compared with the more complete circuit arrangement of FIG. 2 which, in turn, is considerably simpler than the equalizer disclosed in our copending application Ser. No. 572,335.

It should be noted that the feedback signal $\hat{q}_{N-1}(i-1)$ is completely independent of the output signal $\hat{I}_{i-N+p}$ in FIG. 3 and contributes only to a minor extent to that output signal in the equalizer of FIG. 2.

We claim:
1. An equalizer for digital messages insertable between a transmission channel and a load, comprising:
   a data lead for incoming pulses;
   a cascade of several delay networks provided with an upstream and a downstream end, said delay networks having identical delay times corresponding to a pulse cycle;
   first arithmetic means with input connections to said data lead and to said downstream end for differentially combining each incoming pulse with a feedback signal from said cascade and feeding an indi- vidually weighted updating signal to each of said delay networks; and second arithmetic means with input connections to the inputs of at least two of said delay networks proximal to said upstream end for individually weighting respective signal components fed to said delay networks and combining the signal components so weighted into a composite output signal.

2. An equalizer as defined in claim 1, further comprising adders inserted between adjoining delay networks of said cascade; said first arithmetic means including first summing means, connected to said data lead and to said downstream end for receiving said incoming pulses and said feedback signal therefrom, and a first set of multipliers connected in parallel to an output of said first summing means for receiving therefrom an updating signal to be weighted with predetermined first coefficients, one multiplier of said first set having an output connection to said upstream end, the other multipliers of said first set each having an output connection to a respective adder, whereby each of said delay networks receives during each pulse cycle a respective signal component derived from said updating signal; said second arithmetic means including a second set of multipliers, one multiplier of said second set having an input connection to said upstream end, at least one other multiplier of said second set having an input connection to an output of an adder in said cascade proximal to said upstream end, and second summing means connected to said second set of multipliers for receiving therefrom the respective signal components weighted with predetermined second coefficients to be combined into said output signal.

3. An equalizer as defined in claim 2 wherein the number of multipliers of said first set equals the number of multipliers of said second set.

4. An equalizer as defined in claim 3 wherein said cascade includes a further adder with an input connected to said downstream end and with another input connected to the output of said first summing means through a further multiplier of said first set, said further adder having an output connected to said second summing means through a further multiplier of said second set.

* * * * *